Figure 2:
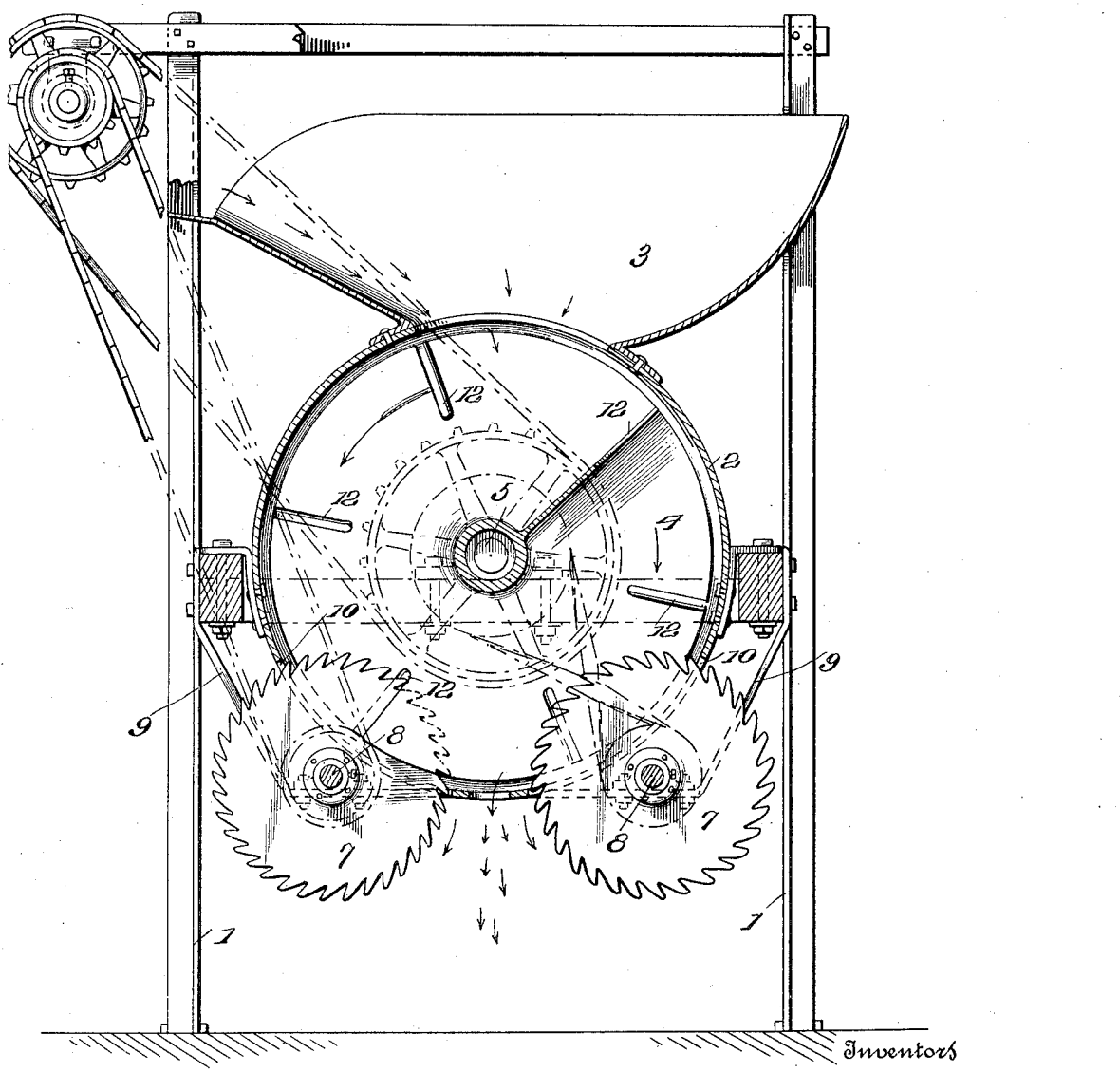

J. H. MACLEARY & H. D. E. LITTLE.
PEANUT STEMMER.
APPLICATION FILED MAY 22, 1913.
1,083,844.
Patented Jan. 6, 1914.
2 SHEETS—SHEET 1.
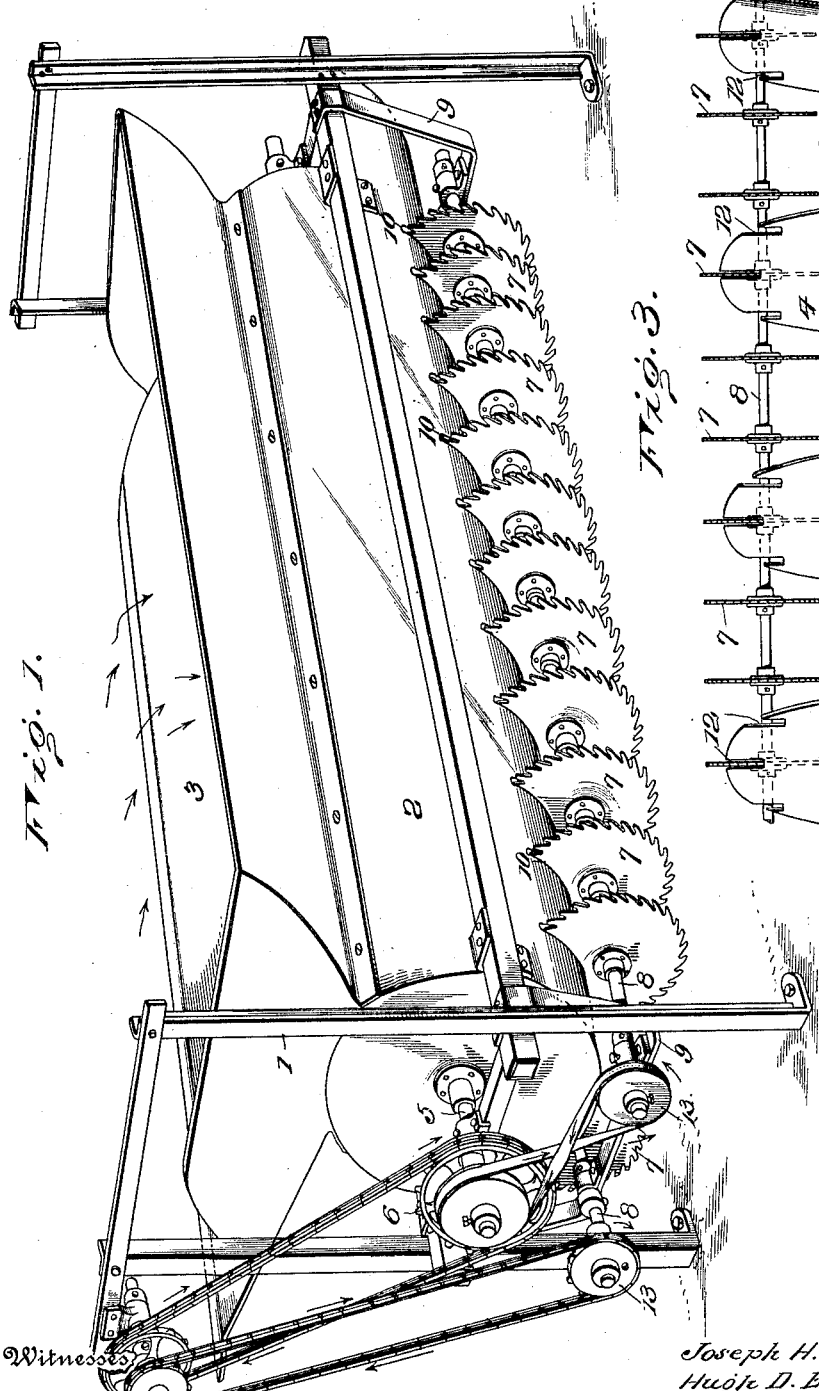
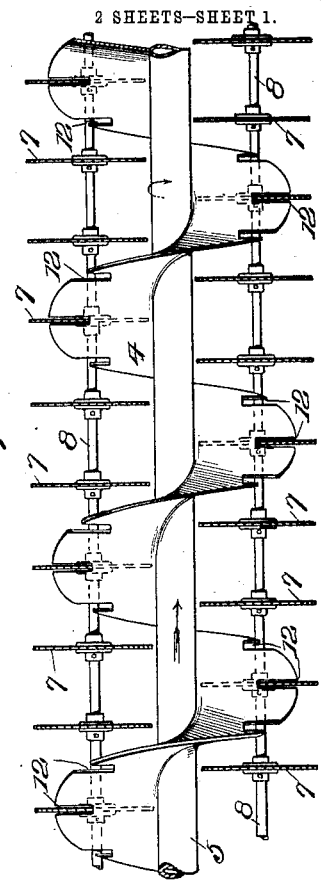
Inventors
Joseph H. Macleary and
Hugh D. E. Little.
Witnesses
By
Attorney J. H. MACLEARY & H. D. E. LITTLE.
PEANUT STEMMER.
APPLICATION FILED MAY 22, 1913.

1,083,844.

Patented Jan. 6, 1914.
2 SHEETS—SHEET 2.

Witnesses
W. A. Williams

Inventors
Joseph H. Macleary
Hugh D. E. Little.

By
Attorney

UNITED STATES PATENT OFFICE.

JOSEPH HENRY MACLEARY AND HUGH D. E. LITTLE, OF SUFFOLK, VIRGINIA.

PEANUT-STEMMER.

1,083,844.   Specification of Letters Patent.   Patented Jan. 6, 1914.

Application filed May 22, 1913. Serial No. 769,235.

*To all whom it may concern:*

Be it known that we, JOSEPH H. MACLEARY and HUGH D. E. LITTLE, of Suffolk, in the county of Nansemond and State of Virginia, have invented certain new and useful Improvements in Peanut-Stemmers; and we do hereby declare the following to be a full, clear, and exact description of the invention, such as will enable others skilled in the art to which it appertains to make and use the same.

The object of this invention is to provide simple and highly efficient means for readily and easily removing stems from peanuts without danger of breaking the shells of the latter.

In the accompanying drawings, Figure 1 is a view in perspective. Fig. 2 is an end view, partly in section. Fig. 3 is a fragmentary view of the screw and the coöperating saws.

Referring to the drawing, 1 designates a frame whereon is mounted a cylindrical casing 2 having an opening in its top through which the peanuts with their stems are delivered from a hopper 3. Extending longitudinally within cylinder 2 is a screw 4, the spiral of which travels within close proximity to the cylinder. We have shown the shaft 5 of this screw mounted in bearings on cross pieces of frame 1, and on this shaft we have indicated a sprocket wheel 6 to which power may be applied from any suitable source.

7—7 designates two series of saws mounted on shafts or mandrels 8 which parallel shaft 5, but on a lower plane, being located beneath cylinder 2 at equal distances from the vertical longitudinal center of the screw. The bearings for shafts 8 are shown mounted on a hanger 9 of frame 1. Each saw is shown in the form of a disk provided at its periphery with a series of teeth facing all in the same direction. Segments of these saws project into the cylinder, which latter is provided with spaced-apart slots 10 to accommodate the saws. The spiral of the screw is also provided with spaced-apart transverse slots 12 for the same purpose, since the saws protrude into the plane of the spiral so that as the screw and the saws are rotated the stems will be effectively removed from the peanuts, which latter will be discharged from the cylinder at one end thereof.

We have shown each of the shafts 8 as having sprocket wheels 13 with which driving chains are designed to engage, power being preferably transmitted from the same source as that which operates the screw. It is preferred to rotate the series of saws in opposite directions, but this is immaterial as they may be operated in the same direction.

In practice, a fan is usually employed to create a draft within the stemmer but as this is an ordinary expedient it has not been shown. The stems with the peanuts thereon are dropped into hopper 3 and are taken up by the screw and carried into and through the cylinder, and upon coming into contact with the rotary saws the stems will be quickly and thoroughly separated from the nuts without danger of injuring the latter.

We claim as our invention:

1. A stemmer comprising a cylinder, a screw within said cylinder, and a series of saws projecting into the cylinder and intersecting the spiral of the screw.

2. A stemmer comprising a cylinder, a screw extending longitudinally of said cylinder, and one or more series of saws also extending into the cylinder on opposite sides of the screw.

3. A stemmer comprising a cylinder having a series of spaced-apart slots formed therein at or near its bottom, a screw within said cylinder, the spiral of said screw having a series of spaced-apart slots designed to coincide with the slots in the cylinder, and a series of rotary saws projecting through the slots in the cylinder and into the slots in the screw.

4. A stemmer comprising a cylinder, a hopper opening into said cylinder, said cylinder having one or more series of spaced-apart slots in its underside on opposite sides of its center, a screw within said cylinder having slots in its spiral coincident with the slots in the cylinder, and one or more series of rotary saws located on opposite sides of the cylinder and projecting through the slots in the latter and into the slots in the screw.

In testimony whereof, we have signed this specification in the presence of two subscribing witnesses.

JOSEPH HENRY MACLEARY.
HUGH D. E. LITTLE.

Witnesses:
G. S. P. HOLLAND, Jr.,
B. E. SAUNDERS.

Copies of this patent may be obtained for five cents each, by addressing the "Commissioner of Patents, Washington, D. C."